United States Patent
Choi et al.

(10) Patent No.: US 9,575,631 B2
(45) Date of Patent: *Feb. 21, 2017

(54) METHOD FOR SELECTING AND CONTROLLING SECOND WORK PROCESS DURING FIRST WORK PROCESS IN MULTITASKING MOBILE TERMINAL

(71) Applicant: PANTECH CO., LTD., Seoul (KR)

(72) Inventors: Seul Ki Choi, Ansan-si (KR); Sang Jin Yoon, Anyang-si (KR)

(73) Assignee: Pantech Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,629

(22) Filed: Jan. 29, 2016

(65) Prior Publication Data

US 2016/0147392 A1    May 26, 2016

Related U.S. Application Data

(63) Continuation of application No. 14/840,844, filed on Aug. 31, 2015, now Pat. No. 9,250,957, which is a
(Continued)

(30) Foreign Application Priority Data

Aug. 11, 2005 (KR) .................. 10-2005-0073877
Oct. 28, 2005 (KR) .................. 10-2005-0102198

(51) Int. Cl.
*G06F 9/46* (2006.01)
*G06F 3/00* (2006.01)
(Continued)

(52) U.S. Cl.
CPC ........... *G06F 3/0482* (2013.01); *G06F 3/0346* (2013.01); *G06F 3/048* (2013.01); *G06F 3/0481* (2013.01); *G06F 3/04817* (2013.01); *G06F 3/04842* (2013.01); *G06F 3/162* (2013.01); *G06F 3/167* (2013.01); *G06F 9/4443* (2013.01);
(Continued)

(58) Field of Classification Search
None
See application file for complete search history.

(56) References Cited

U.S. PATENT DOCUMENTS 5,075,675 A    12/1991   Barker et al.
5,859,639 A    1/1999    Ebrahim
(Continued)

OTHER PUBLICATIONS

Nokia Corp., "User's Guide for Nokia 5110", Copyright 2004, Nokia Mobile Phones, Finland.
(Continued)

*Primary Examiner* — Charles Swift
(74) *Attorney, Agent, or Firm* — H.C. Park & Associates, PLC (57) ABSTRACT

Provided is a method for controlling a plurality of work processes in a multitasking mobile terminal, and more particularly, a method for selecting a second work process during a first work process and controlling a predetermined function of the selected second work process. In the controlling method, icons corresponding to the respective work processes are displayed in response to a user command, and a desired work process is selected through the displayed icons. A predetermined function of the selected work process is controlled through a pop-up menu activated in response to the user command.

20 Claims, 10 Drawing Sheets

Related U.S. Application Data continuation of application No. 11/495,863, filed on Jul. 28, 2006, now Pat. No. 9,122,518.

(51) Int. Cl.

| | | |
|---|---|---|
| *G06F 3/048* | (2013.01) | |
| *G06F 3/14* | (2006.01) | |
| *G06F 3/0482* | (2013.01) | |
| *G06F 3/0481* | (2013.01) | |
| *G06F 9/44* | (2006.01) | |
| *G06F 9/48* | (2006.01) | |
| *G06F 3/0346* | (2013.01) | |
| *G06F 3/0484* | (2013.01) | |
| *G06F 3/16* | (2006.01) | |

(52) U.S. Cl.
CPC ........... *G06F 9/48* (2013.01); *G06F 9/485* (2013.01); *G06F 9/4806* (2013.01); *G06F 9/4843* (2013.01); *G06F 9/4881* (2013.01)

(56) References Cited

U.S. PATENT DOCUMENTS

| | | |
|---|---|---|
| 6,388,686 B1 | 5/2002 | Hetherington et al. |
| 6,546,263 B1 | 4/2003 | Petty et al. |
| 7,123,945 B2 | 10/2006 | Kokubo |
| 7,222,304 B2 | 5/2007 | Beaton et al. |
| 7,546,188 B2 | 6/2009 | Nezu et al. |
| 7,623,119 B2 | 11/2009 | Autio et al. |
| 8,106,877 B2 | 1/2012 | Park et al. |
| 2002/0080186 A1 | 6/2002 | Frederiksen |
| 2003/0011638 A1 | 1/2003 | Chung |
| 2003/0013483 A1 | 1/2003 | Ausems et al. |
| 2003/0016251 A1 | 1/2003 | Kondo |
| 2004/0229200 A1 | 11/2004 | McKeon et al. |
| 2005/0086611 A1 | 4/2005 | Takabe et al. |
| 2005/0120306 A1 | 6/2005 | Klassen et al. |
| 2005/0183017 A1 | 8/2005 | Cain |
| 2005/0229103 A1 | 10/2005 | King |
| 2006/0075347 A1 | 4/2006 | Rehm |
| 2006/0107227 A1 | 5/2006 | Kiljander |
| 2006/0236266 A1 | 10/2006 | Majava |
| 2006/0247851 A1 | 11/2006 | Morris |
| 2007/0003224 A1 | 1/2007 | Krikorian et al. |
| 2007/0192741 A1 | 8/2007 | Yoritate et al. |

OTHER PUBLICATIONS

Non-Final Office Action issued on Aug. 31, 2010, in U.S. Appl. No. 11/495,683.
Final Office Action issued on Mar. 16, 2011, in U.S. Appl. No. 11/495,683.
Non-Final Office Action issued on Oct. 22, 2012, in U.S. Appl. No. 11/495,683.
Final Office Action issued on Mar. 28, 2013, in U.S. Appl. No. 11/495,683.
Non-Final Office Action issued on Jul. 10, 2013, in U.S. Appl. No. 11/495,683.
Final Office Action issued on Dec. 4, 2013, in U.S. Appl. No. 11/495,683.
Non-Final Office Action issued on Sep. 23, 2014, in U.S. Appl. No. 11/495,683.
Notice of Allowance issued on Apr. 22, 2015, in U.S. Appl. No. 11/495,683.
Notice of Allowance issued on Sep. 25, 2015, in U.S. Appl. No. 14/840,844.

METHOD FOR SELECTING AND CONTROLLING SECOND WORK PROCESS DURING FIRST WORK PROCESS IN MULTITASKING MOBILE TERMINAL

CROSS-REFERENCE TO RELATED PATENT APPLICATIONS

This application is a Continuation of U.S. patent application Ser. No. 14/840,844, filed on Aug. 31, 2015, which is a Continuation of U.S. patent application Ser. No. 11/495,863, filed on Jul. 28, 2006, now U.S. Pat. No. 9,122,518, and claims priority from and the benefit of Korean Patent Application No. 10-2005-0073877 filed on Aug. 11, 2005, and Korean Patent Application No. 10-2005-0102198 filed on Oct. 28, 2005, each of which is hereby incorporated by reference for all purpose as if fully set forth herein.

BACKGROUND

Field

The present invention relates to a method for controlling a plurality of work processes in a multitasking mobile terminal, and more particularly, to a method for selecting a second work process during a first work process and controlling a predetermined function of the selected second work process.

Discussion of the Background

With the recent advance of mobile communication technology, various kinds of mobile terminals such as hand-held phones and personal digital assistants•(PDAs) are commercially available. The mobile terminals have a wireless communication function, a camera function, a multimedia play function, an Internet connection function, and the like. Also, as the performance of microprocessors built in the mobile terminals is improved, a plurality of work processes can be performed concurrently. For example, an MP3 music file can be played during a phone call, or a short message service (SMS) message can be sent while an MP3 music file is played.

Figure 1:
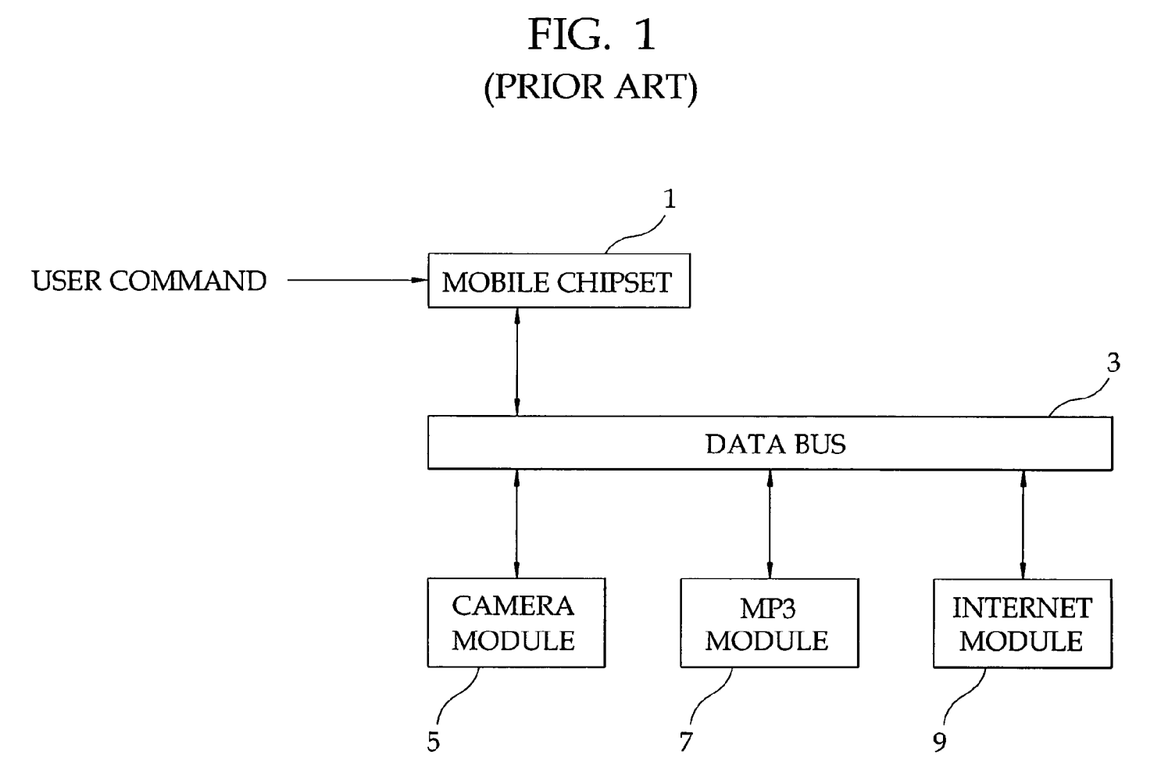
FIG. 1 is a functional block diagram of a conventional multitasking mobile terminal that concurrently performs a plurality of work processes.

FIG. 1 is a functional block diagram of a conventional multitasking mobile terminal that concurrently performs a plurality of work processes. A mobile chipset 1 controls an overall operation of the mobile terminal according to user commands. The mobile chipset 1 transmits a control signal through a data bus 3 to a camera module 5, an MP3 module 7, and an Internet module 9 according to the user commands. Work processes of the camera module 5, the MP3 module 7, and the Internet module 9 are concurrently performed according to the control signal.

Figure 2:
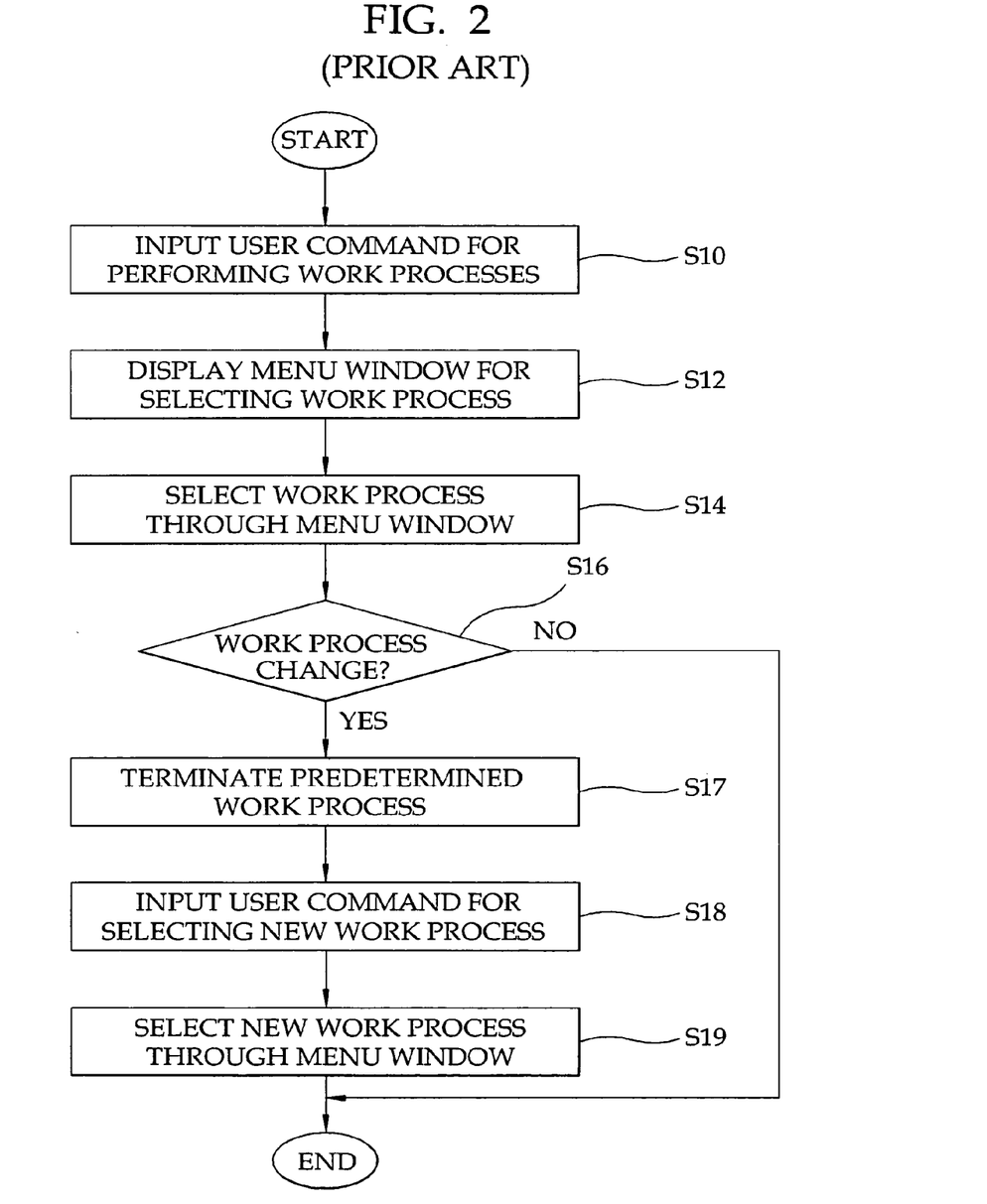
FIG. 2 is a flowchart illustrating a conventional method for selecting a second work process during a first work process in a multitasking mobile terminal that concurrently performs a plurality of work processes.

FIG. 2 is a flowchart illustrating a conventional method for selecting a second work process during a first work process in a multitasking mobile terminal that concurrently performs a plurality of work processes. In step S10, while a first work process is performed, a user command for a second work process is inputted. In step S12, a menu window for selecting a new work process is displayed on a display of the mobile terminal in response to the user command. In step S14, the user selects a desired new work process through the displayed menu window. In steps S16 and S17, when the user wants to change the selected process into another new process, the selected work process is terminated. In step S18, a user command for selecting the another new work process is inputted. In step S19, the another new work process is selected through the displayed menu window in response to the user command.

Figure 3:
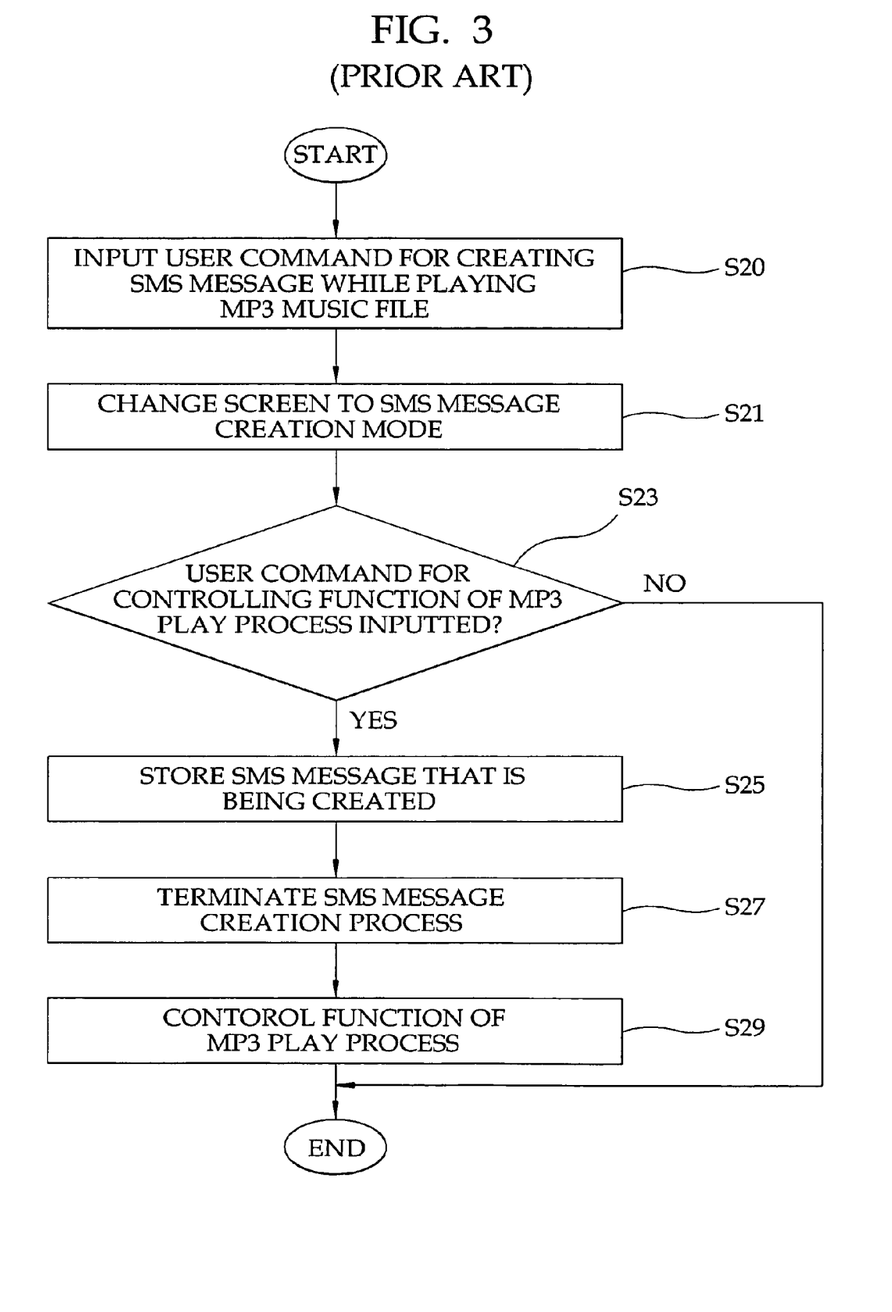
FIG. 3 is a flowchart illustrating a conventional method for controlling a function of a second work process during a first work process in a multitasking mobile terminal that concurrently performs a plurality of work processes.

FIG. 3 is a flowchart chart illustrating a conventional method for controlling a predetermined function of a second work process during a first work process in a multitasking mobile terminal that concurrently performs a plurality of work processes.

In step S20, assuming that the first work process is an MP3 play process and the second work process is an SMS message creation process, a first command of user for the SMS message creation process is inputted while an MP3 music file is played. In step S21, a screen for the SMS message creation process is displayed in response to the first command of user, and the SMS message creation process is performed while the MP3 music file is played. In step S23, it is determined whether or not a second command of user for controlling a function of the MP3 play process is inputted while an SMS message is created. In steps S25 and S27, when the second command of user is inputted, the SMS message that is being created is stored in the memory and the SMS message creation process is terminated. In step S29, after the termination of SMS message creation process, the function of the MP3 play process is controlled. When the SMS message creation process is terminated, a screen for the MP3 play process is again displayed, and a third command of user for controlling the function of the MP3 play process is inputted. A control signal corresponding to the third command of user is generated and the function of the MP3 play process is controlled.

SUMMARY

In the conventional method for selecting the work process, when selecting a wok process that is concurrently performed, the user has to select a new work process through a displayed menu window. Also, in order to terminate a predetermined work process among a plurality of work processes that are concurrently performed and select a new work process, the user has to select the new work process through the menu window.

Also, in the conventional method for controlling a function of the work process, the user has to terminate an SMS message creation process so as to control a function of an MP3 play process (e.g., volume control, list selection of MP3 music files) while creating an SMS message. In case where the SMS message creation process is terminated, the SMS message that is being created is deleted or stored in a predetermined memory space such as a temporary mailbox. Consequently, the conventional method is inconvenient in that the user has to again select the SMS message creation process and create the SMS message or reload the SMS message stored in the temporary mailbox.

The present invention provides a method for selecting a work process of a multitasking mobile terminal through an icon corresponding to the work process.

The present invention also provides a method for controlling a function of a work process through an activated pop-up menu in a multitasking mobile terminal that concurrently performs a plurality of work processes.

According to an aspect of the present invention, there is provided a method for selecting a second work process during a first work process in a multitasking mobile terminal that concurrently performs the first work process and the second work process. The selecting method includes: inputting a user command for selecting the second work process; and displaying an icon corresponding to the second work process in response to the user command, and selecting the second work process based on the displayed icon.

According to another aspect of the present invention, there is provided a method for controlling a predetermined function of a second work process during a first work process in a multitasking mobile terminal that concurrently performs the first work process and the second work process. The controlling method includes: inputting a first command of user for selecting a predetermined function of the second work process; activating a pop-up menu for controlling the predetermined function of the second work process in response to the first command of user; and controlling the predetermined function of the second work process through the activated pop-up menu.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE ILLUSTRATED EMBODIMENTS

Hereinafter, a method for selecting a second work process during a first work process and controlling a function of the selected second work process according to the present invention will be described in detail with reference to the accompanying drawings.

Figure 4:
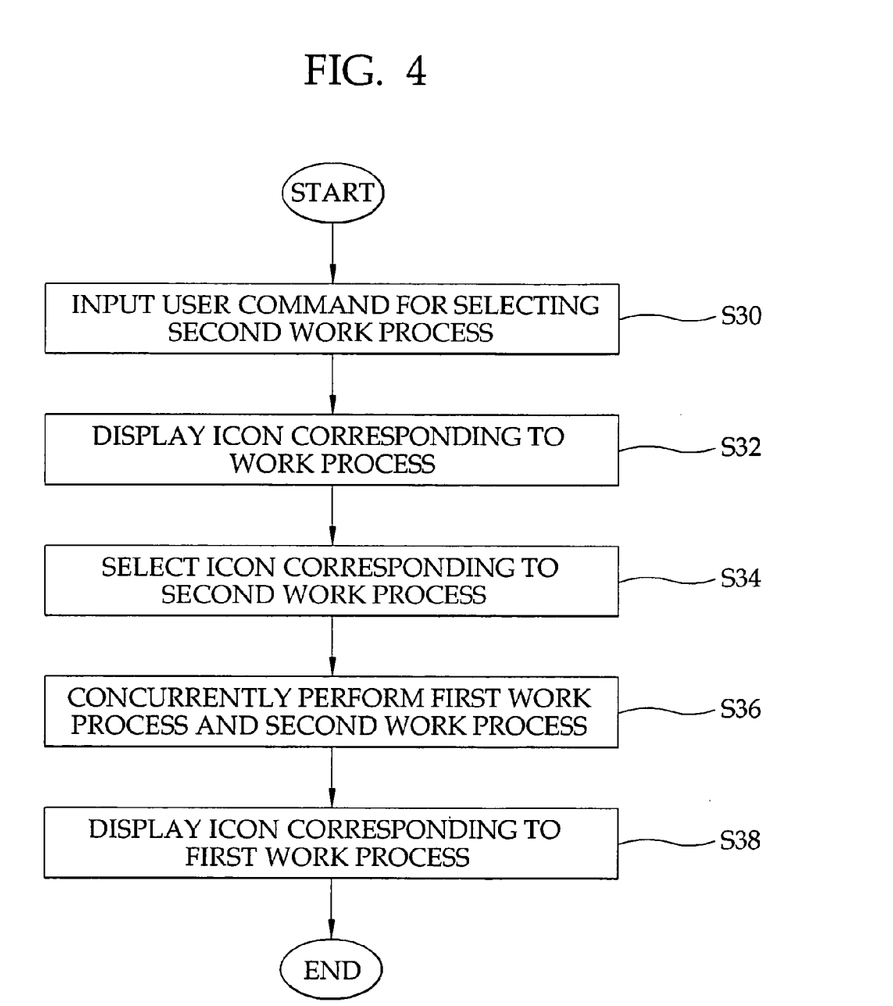
FIG. 4 is a flowchart illustrating a method for selecting a second work process in a multitasking mobile terminal that concurrently performs a first work process and the second work process.

FIG. 4 is a flowchart illustrating a method for selecting a second work process in a multitasking mobile terminal that concurrently performs a first work process and the second work process according to an embodiment of the present invention. Referring to FIG. 4, in step S30, a user command for selecting the second work process is inputted. In step S32, while the first work is processed through the first work process of the mobile terminal, a first command of user for multitasking of the second work process together with the first work is inputted. Icons corresponding to the work processes are displayed in response to the first user command. The icons are previously designated with respect to all work processes of the mobile terminal. Every when the first command of user is inputted, the icons are displayed in turn.

In step S34, when an icon corresponding to the second work process the user wants to select is displayed, a second command of user for selecting the displayed icon is inputted. In step S36, the first work of the first work process and the second work of the second work process are concurrently processed in response to the second command of user. For example, when the user intends to send an SMS message while an MP3 music file is played, an MP3 play process and an SMS message send process are divided in quantum units and alternately processed at regular time intervals.

In step S38, an icon corresponding to the first work process is preferably displayed together with an activated screen image of the second work process. The user can know from the displayed icon that the first work process is concurrently performed in the second work process.

FIG. 5A, FIG. 5B, FIG. 5C, and FIG. 5D illustrate the displayed icons of the work processes according to an embodiment of the present invention.

Figure 5A:
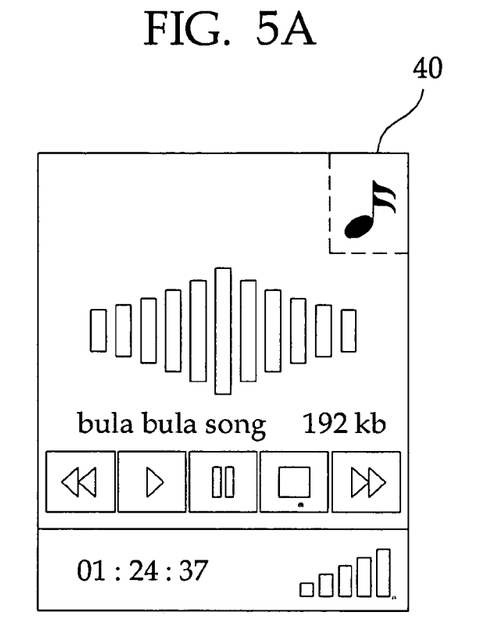
FIGS. 5A, 5B, 5C, and 5D illustrate the displayed icons of the work processes according to an embodiment of the present invention.

Referring to FIG. 5A, an icon indicating an MP3 play process is displayed in a first portion of a display 40, while an MP3 music file is played.

Figure 5B:
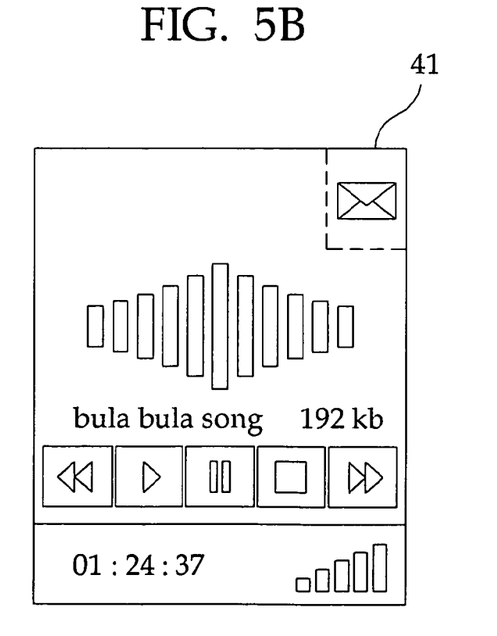

Referring to FIG. 5B, when a first command of user for sending an SMS message is inputted while an MP3 music file is played, an icon indicating an SMS message creation process is displayed in a first portion of a display 41.

Figure 5C:
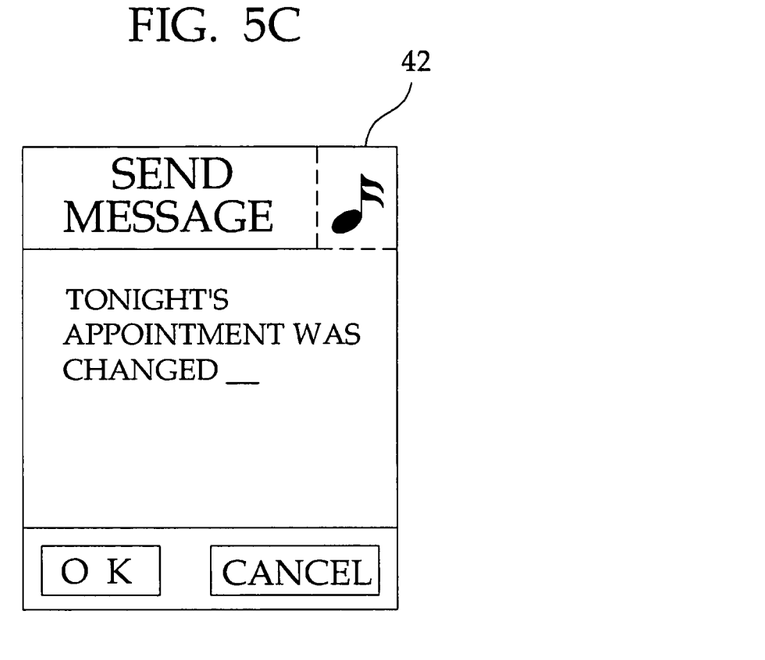

Referring to FIG. 5C, when a second command of user for selecting a displayed SMS icon is inputted, an SMS message creation process is activated, and an MP3 play process and the SMS message creation process are performed concurrently. Preferably, an icon corresponding to the MP3 play process that is performed concurrently is displayed in a first portion of a display 42 together with a screen of the SMS message creation process.

Figure 5D:
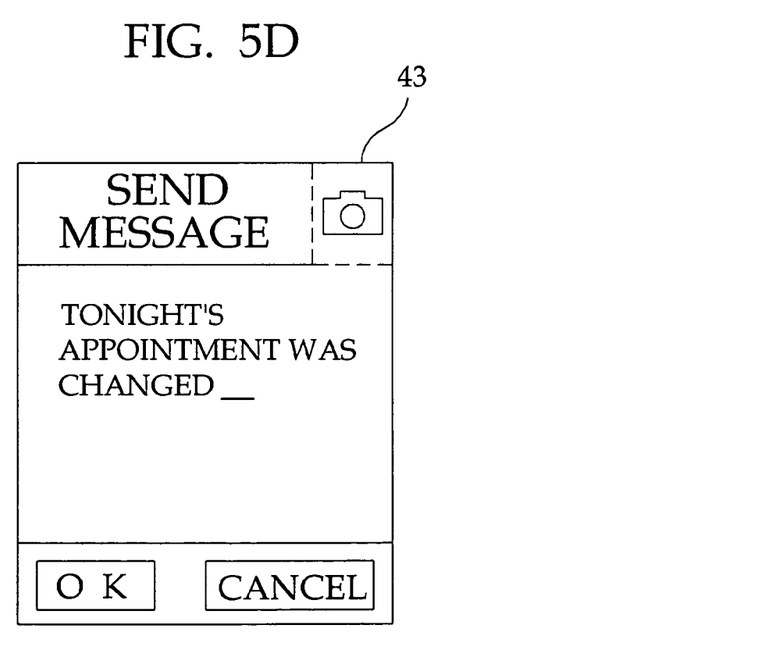

Referring to FIG. 5D, when a first command of user for selecting a new work process of a camera mode is inputted, an icon corresponding to a camera mode work process is displayed in a first portion of a display 43 in response to the first user command. By selecting the displayed camera mode icon, the work process for sending an SMS message is changed to the camera mode work process.

Figure 6:
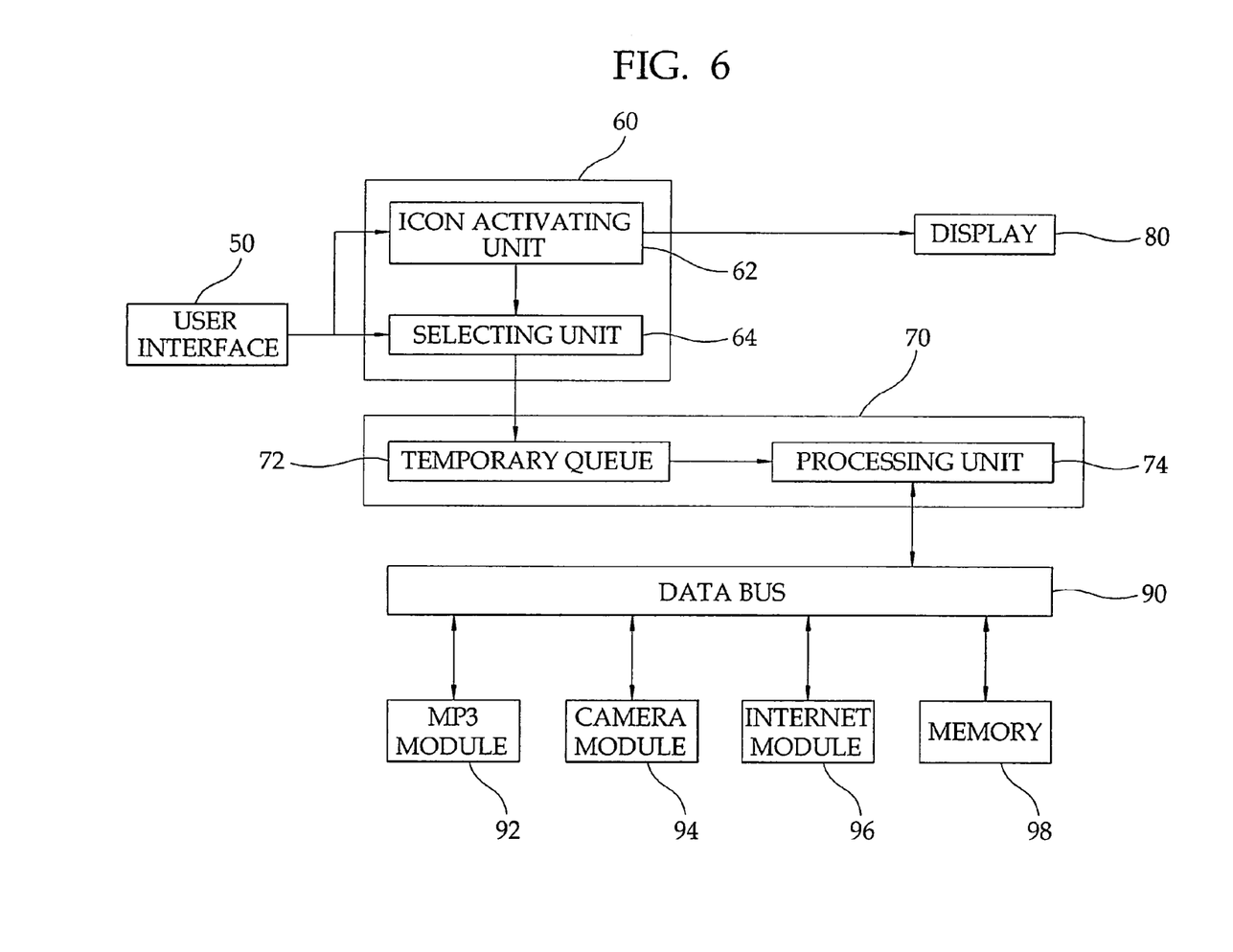
FIG. 6 is a functional block diagram of an apparatus for selecting a work process of a multitasking mobile terminal that concurrently performs a first work process and a second work process according to an embodiment of the present invention.

FIG. 6 is a functional block diagram of an apparatus for selecting the work process of the multitasking mobile terminal that concurrently performs the first work process and the second work process. Referring to FIG. 6, the apparatus according to the present invention includes a user interface 50, a second work process selecting unit 60, a multiprocessing unit 70, a display 80, a data bus 90, and a plurality of application units 92, 94 and 96. The plurality of application units 92, 94 and 96 are controlled via the data bus 90 by the multiprocessing unit 70.

A user commands for changing the work process of the mobile terminal is inputted through the user interface 50. The user interface 50 may be a voice recognition unit for recognizing user's voice, or a motion recognition unit for recognizing a motion of the mobile terminal.

A first command of user for selecting the second work process that is concurrently performed together with the first work process of the mobile terminal is inputted through the user interface 50 to the second work process selecting unit 60. The second work process selecting unit 60 includes an icon activating unit 62 and a selecting unit 64. Every when the first command of user is inputted, the icon activating unit 62 sequentially displays icons corresponding to the respective work processes of the mobile terminal through the display 80. A second command of user is inputted through the user interface 50 to the selecting unit 64 so as to select the second work process concurrently performed together with the first work process among the sequentially displayed icons. The selecting unit 64 provides the work process corresponding to the selected icon to the multiprocessing unit 70 in response to the second user command.

The multiprocessing unit 70 includes a temporary queue 72 and a processing unit 74. The temporary queue 72 stores the first work process and the second work process, which are provided from the selecting unit 64 and performed concurrently. The processing unit 74 generates a control signal for alternately performing the first work process and the second work process, which are stored in the temporary queue 72, at regular time intervals. The processing unit 74 is connected through the data bus 90 to the MP3 module 92, the camera module 94, and the Internet module 96. The MP3 module 92, the camera module 94, and the Internet module 96 perform a work process of an MP3 play mode, a work process of a camera mode, and a work process of an Internet connection mode in response to the control signal outputted from the processing unit 74, respectively. Other applications can be further added to the mobile terminal according to the fields to which the present invention is applied. It is apparent to those skilled in the art that these embodiments will fall within the scope of the present invention.

Figure 7:
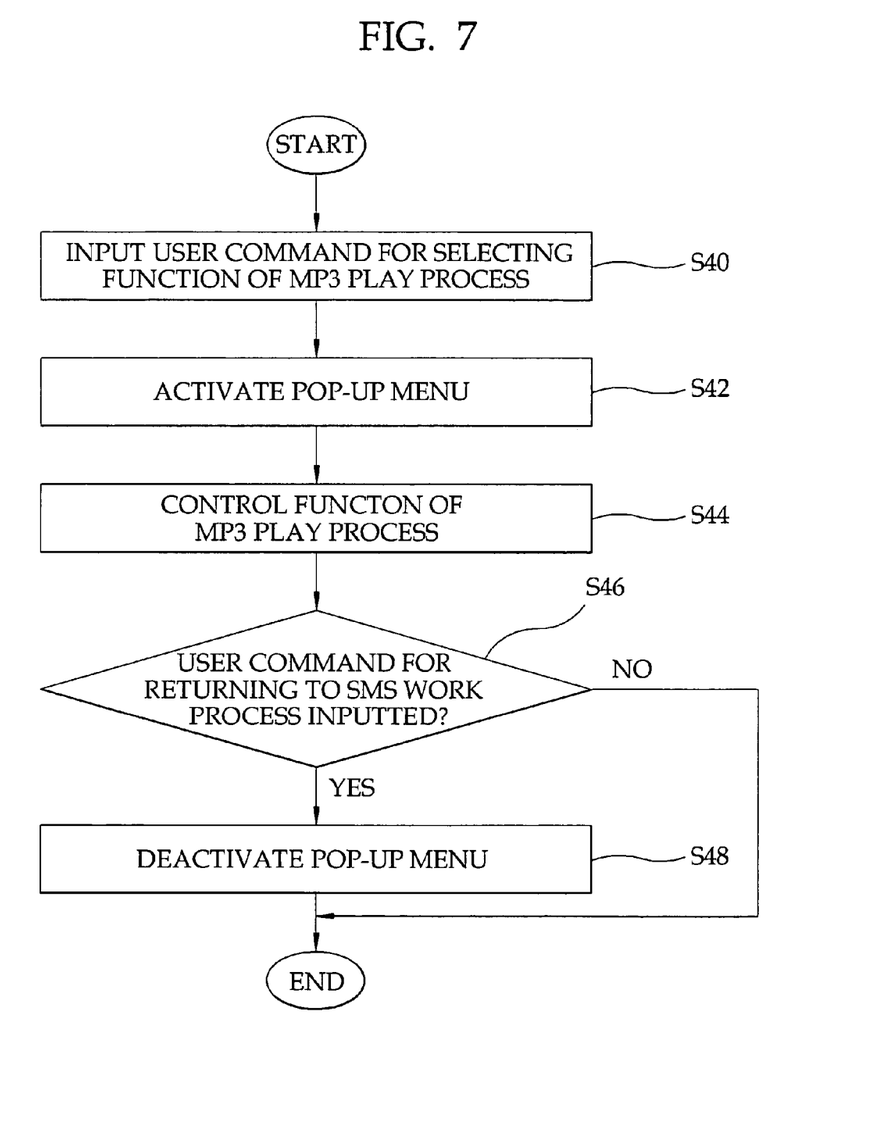
FIG. 7 is a flowchart illustrating a method for controlling a function of an MP3 play process during the creation of an SMS message in a multitasking mobile terminal that concurrently performs the MP3 play process and the SMS message creation process.

FIG. 7 is a flowchart illustrating a method for controlling a function of the MP3 play process, while the SMS message is created, according to an embodiment of the present invention.

Referring to FIG. 7, in step S40, a first command of user is inputted so as to control the function of the MP3 play process while the SMS message is created. In step S42, a pop-up menu for controlling the function of the MP3 play process is activated in the display of the mobile terminal in response to the first command of user.

In step S44, when the pop-up menu is activated, a second command of user is inputted for controlling the function of the MP3 play process, and the function of the MP3 play process is controlled in response to the second command of user. When the pop-up menu is activated, a pop-up process for controlling the function of the MP3 play process is assigned to a temporary queue by using the activated pop-up menu, and the pop-up process is concurrently performed together with the creation of the SMS message.

That is, the pop-up process and the SMS message creation process are divided in quantum units, and the pop-up process and the SMS message send process are alternately performed at regular time intervals. When the second command of user is inputted, the pop-up process generates the control signal corresponding to the second command of user and provides the generated control signal to the MP3 play process. The MP3 play process controls the function of the MP3 play process in response to the control signal.

In step S46, it is determined whether or not a third command of user for returning to the SMS message creation process is inputted. In step S48, when the third command of user is inputted after the control of the function of the MP3 play process is completed, the activated pop-up menu is deactivated. Even though the pop-up menu is deleted from the temporary queue and the pop-up process is terminated, the MP3 play process and the SMS message creation process continue to be performed and the user can keep on creating the SMS message while listening to the MP3 music.

Preferably, the first to third commands of user may be inputted through a predetermined key arranged at a keypad of the mobile terminal, a user's voice, a motion of the mobile terminal, and the like.

Preferably, the first and third commands of user may be inputted through the identical key of the mobile terminal.

Figure 8A:
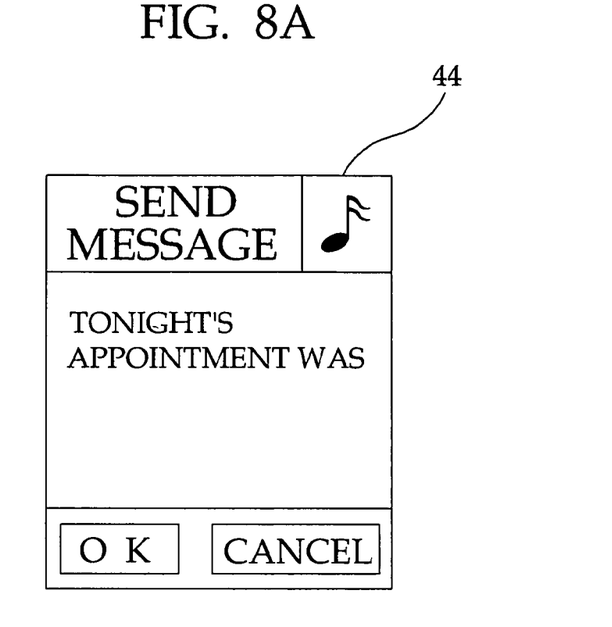
FIGS. 8A and 8B illustrate the displayed pop-up menus according to an embodiment of the present invention.
Figure 8B:
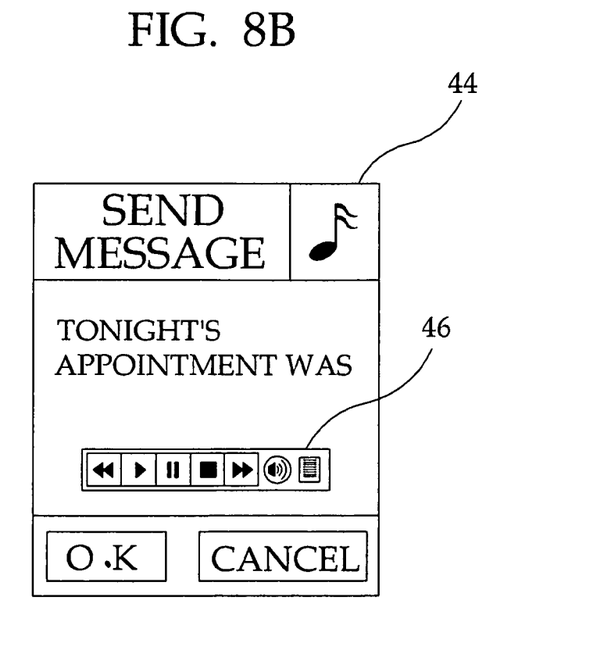

FIG. 8A and FIG. 8B illustrate the displayed pop-up menus according to an embodiment of the present invention.

FIG. 8A illustrates a pop-up menu displayed when the MP3 play process and the SMS message creation process are concurrently performed. Preferably, an icon 44 indicating the MP3 play process concurrently performed together with the SMS message creation process is also displayed in a portion of a display.

FIG. 8B illustrates a pop-up menu displayed in response to the first command of user. The pop-up menu 46 has a predetermined format, and image information for the pop-up menu 46 displayed is stored in the memory of the mobile terminal. Preferably, in response to the first command of user, the pop-up menu 46 may be displayed brightly and clearly, while the screen corresponding to the SMS message process may be displayed darkly and unclearly.

Figure 9:
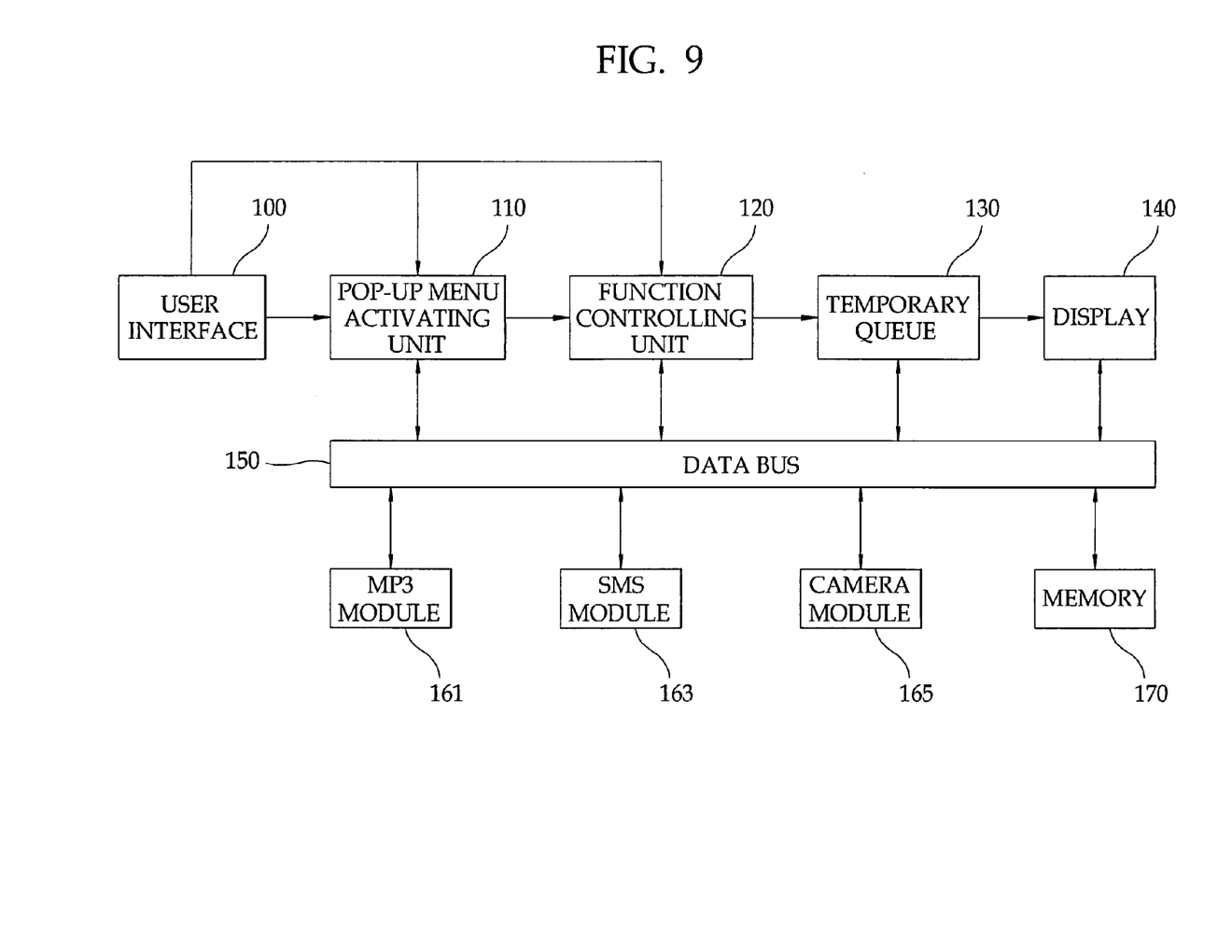
FIG. 9 is a functional block diagram of an apparatus for controlling a function of the MP3 play process in the multitasking mobile terminal that concurrently performs the MP3 play process and the SMS message creation process according to an embodiment of the present invention.

FIG. 9 is a functional block diagram of an apparatus for controlling the function of the MP3 play process in the multitasking mobile terminal that concurrently performs the MP3 play process and the SMS message creation process according to an embodiment of the present invention. Referring to FIG. 9, the apparatus according to the present invention includes a user interface 100, a pop-up menu activating unit 110, a function controlling unit 120, a temporary queue 130, a display 140, a data bus 150, a plurality of application modules 161, 163 and 165, and a memory 170.

A first command of user is inputted through the user interface 100. The pop-up menu activating unit 110 acquires image information of a pop-up menu stored in the memory 170 in a predetermined format through the data bus 150, and activates the pop-up menu on the display 140. Meanwhile, the temporary queue 130 stores a pop-up process.

A second command of user for controlling the function of the MP3 play process is inputted through the user interface 100, and the function controlling unit 120 generates a first control signal for controlling the pop-up menu in response to the second command of user. The MP3 play process, the SMS message creation process, and the pop-up process, which are stored in the temporary queue 130, are alternately performed at regular time intervals. The generated first control signal is transferred through the data bus 150 to the MP3 module, and the function of the MP3 play process is controlled.

A third command of user for terminating the pop-up process is inputted through the user interface 100. The function controlling unit 120 generates a second control signal for deactivating the pop-up menu in response to the third command of user. The generated second control signal is transferred through the data bus 150 to the temporary queue 130. The temporary queue 130 deletes the pop-up process in response to the second control signal, thus terminating the pop-up process.

The embodiments of the present invention can be written as computer programs and can be implemented in generaluse digital computers that execute the programs using a computer readable recording medium. Examples of the computer readable recording medium include magnetic storage media (e.g., ROM, floppy disks, hard disks), optical recording media (e.g., CD-ROMs, or DVDs), and storage media such as carrier waves (e.g., transmission through the Internet).

The above-mentioned method for selecting the second work process according to the present invention can simply select the second work process by selecting the icons sequentially displayed while the first work process is performed.

Also, the above-described method for controlling the function of the second work process according to the present invention can simply control the function of the MP3 play process during the creation of the SMS message by controlling the function of the MP3 play process through the pop-up menu in the multitasking mobile terminal that concurrently performs the MP3 play process and the SMS message creation process.

Further, the above-described method for controlling the function of the second work process according to the present invention can continuously create the SMS message after controlling the function of the MP3 play process by controlling the function of the MP3 play process through the pop-up menu in the multitasking mobile terminal that concurrently the MP3 play process and the SMS message creation process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling a predetermined function of a second work process during a first work process in a multitasking mobile terminal that performs the first work process and the second work process, the method comprising:
    displaying one icon in a designated portion of a display, wherein the displayed icon corresponds to the first work process;
    if the displayed icon corresponding to the first work process is selected, displaying a screen of the first work process in the display;
    in response to a first command for sequentially displaying icons, performing sequential display of icons such that an icon corresponding to the second work process is displayed, wherein the icon corresponding to the second work process is displayed in the designated portion of the display;
    in response to a second command for changing to the second work process, replacing the screen of the first work process with a screen of the second work process; controlling the multitasking of the second work process and the first work process;
in response to a third command for activating a control menu for controlling a predetermined function of the first work process, activating the control menu for controlling the predetermined function of the first work process; and
    in response to a fourth command for controlling the predetermined function of the first work process through the activated control menu, controlling the predetermined function of the first work process through the activated control menu.

2. The method of claim 1, wherein the controlling the predetermined function of the first work process comprises:
    generating a control signal for controlling the predetermined function of the first work process in response to the fourth command; and
    controlling the predetermined function of the first work process in response to the generated control signal.

3. The method of claim 1, further comprising:
    in response to a fifth command for deactivating the activated control menu, deactivating the activated control menu.

4. The method of claim 1, wherein the first work process is an MP3 play process.

5. The method of claim 1, wherein an item of the first work process is displayed relatively brighter or clearer than the screen of the first work process.

6. The method of claim 1, wherein an item of the second work process is displayed relatively brighter or clearer than an item or a screen of a work process other than the second work process.

7. The method of claim 3, wherein the third command and the fifth command are inputted through at least one of a predetermined key, a user's voice, and a motion of the mobile terminal.

8. The method of claim 1, wherein, in response to a repetition of the first command, performing sequential display of icons such that a displayed icon disappears from a screen of the mobile terminal and an icon appears on the screen of the mobile terminal.

9. The method of claim 1, wherein an icon to be displayed in the designated portion is replaced with an icon that is different from the icon corresponding to the second work process in response to the first command.

10. The method of claim 1, wherein the displayed icon is displayed together with at least a part of a screen image of a work process in the display.

11. A method for selecting a second work process during a first work process in a multitasking mobile terminal that performs the first work process and the second work process in a multitasking environment, the method comprising:
    displaying one icon in a designated portion of a display, wherein the displayed icon corresponds to the first work process;
    if the displayed icon corresponding to the first work process is selected, displaying a screen of the first work process in the display;
    in response to a first command for sequentially displaying icons, performing sequential display of icons such that an icon corresponding to the second work process is displayed, wherein the icon corresponding to the second work process is displayed in the designated portion of the display;
    in response to a second command for changing to the second work process, replacing the screen of the first work process with a screen of the second work process; and
    controlling the multitasking of the second work process and the first work process,
    wherein an item of the second work process is displayed relatively brighter or clearer than an item or a screen of a work process other than the second work process.

12. The method of claim 11, wherein, in response to a repetition of the first command, performing sequential display of icons such that a displayed icon disappears from a screen of the mobile terminal and an icon appears on the screen of the mobile terminal.

13. The method of claim 11, wherein an icon to be displayed in the designated portion is replaced with an icon that is different from the icon corresponding to the second work process in response to the first command.

14. The method of claim 11, wherein the first command and the second command are inputted through at least one of a predetermined key, a user's voice, and a motion of the mobile terminal, and
wherein the displayed icon is displayed together with at least a part of a screen image of a work process in the display.

15. The method of claim 11, wherein the screen of the first work process is displayed together with sequentially displayed icons corresponding to respective work processes of the mobile terminal.

16. A method for selecting a second work process during a first work process in a multitasking mobile terminal that performs the first work process and the second work process in a multitasking environment, the method comprising:
displaying one icon in a designated portion of a display, wherein the displayed icon corresponds to the first work process;
if the displayed icon corresponding to the first work process is selected, displaying a screen of the first work process in the display;
in response to a first command for sequentially displaying icons, performing sequential display of icons such that an icon corresponding to the second work process is displayed, wherein the icon corresponding to the second work process is displayed in the designated portion of the display;
in response to a second command for changing to the second work process, replacing the screen of the first work process with a screen of the second work process; and
controlling the multitasking of the second work process and the first work process,
wherein an item of the first work process is displayed relatively brighter or clearer than the screen of the first work process.

17. The method of claim 16, wherein, in response to a repetition of the first command, performing sequential display of icons such that a displayed icon disappears from a screen of the mobile terminal and an icon appears on the screen of the mobile terminal.

18. The method of claim 16, wherein an icon to be displayed in the designated portion is replaced with an icon that is different from the icon corresponding to the second work process in response to the first command.

19. The method of claim 16, wherein the first command and the second command are inputted through at least one of a predetermined key, a user's voice, and a motion of the mobile terminal, and
wherein the displayed icon is displayed together with at least a part of a screen image of a work process in the display.

20. The method of claim 16, wherein the screen of the first work process is displayed together with sequentially displayed icons corresponding to respective work processes of the mobile terminal.

\* \* \* \* \*